3,531,461
PRODUCTION AND RECOVERY OF METHYL α-D-MANNOPYRANOSIDE
John Kelvin Hamilton and Franklin W. Herrick, Shelton, and Jim D. Wilson, Olympia, Wash., assignors to ITT Rayonier Incorporated
No Drawing. Filed Nov. 2, 1967, Ser. No. 680,019
Int. Cl. C07c 47/18
U.S. Cl. 260—210                11 Claims

ABSTRACT OF THE DISCLOSURE

A method is disclosed for producing, isolating and recovering essentially pure crystalline methyl α-D-mannopyranoside from plant materials and their extracts that contain wood sugars and/or lower molecular weight oligo- and polysaccharides among which are D-mannose and polymers and copolymers thereof. The crude mannose-containing plant material is treated under essentially andhydrous conditions at an elevated temperature with methanol containing a mineral acid such as HCl or $H_2SO_4$ to convert the carbohydrates to simple wood sugar methyl glycosides. The hot, acidic, glycoside-containing mixture is then cooled to ambient temperature or below whereupon crude methyl α-D-mannopyranoside preferentially crystallizes out of solution and is recovered. The crude methyl α-D-mannopyranoside thus obtained can be purified by redissolving it in hot solvent, removing the color with an adsorptive material such as activated carbon, filtering the hot solution, cooling it and recrystallizing the methyl α-D-mannopyranoside as before.

BACKGROUND OF THE INVENTION

Methyl α-D-mannopyranoside can be used in resins, etc. In addition, it can be readily and inexpensively converted to pure mannose or to derivatives such as mannitol which have broad and recognized utility in dietary supplements, resins, plastics, plasticizers, explosives and numerous other useful products.

Mannose polymers from which methyl α-D-mannopyranoside may be prepared are abundant in nature, these being important constituents of many forms and varieties of plant tissue. Examples of plant tissue containing substantial amounts of mannose polymers include such diverse materials as ivory nuts, locust beans, coffee beans, guar seeds, plant gums and exudates, and the wood of coniferous trees. Because of the complexity of the carbohydrate material in which mannose is found, however, it and its derivatives have been very difficult and expensive to isolate and recover in a reasonably pure form. The discovery of a practical method of isolation and recovery of the mannose constituents of plant tissue in the form of a relatively inexpensive and highly useful pure chemical is an important contribution to the chemical industry.

In the past, the preparation of mannose and its derivatives (excluding mannitol), has been based almost entirely on ivory nut meal, said meal being essentially a pure mannan polymer. Ivory nut meal, however, is relatively expensive. Our invention, while operable with the relatively more expensive starting materials, is more beneficially and usefully applied to source materials that are now discarded or of little value. Particularly desirable are the non-cellulosic carbohydrates extracted from coniferous woods during pulping and refining of cellulose and from the so-called "Masonite" process. The first stage of the pulping process is frequently a high pressure, high temperature steam or water treatment which hydrolyzes, solubilizes and removes substantial amounts of carbohydrates, up to 85 percent of said extract being a mixture of wood sugars and lower molecular weight oligo- and polysaccharides containing a substantial amount of mannose. The "Masonite" process yields a similar product. Sulfite spent liquor from the treatment of coniferous wood is yet another mannose-rich starting material, as is also the cold aqueous alkaline extract removed in the refining of coniferous wood pulps. Enormous quantities of these extracts and spent liquors are available at relatively low cost and provide mannose containing starting materials from which essentially pure white crystalline methyl α-D-mannopyranoside can be readily and inexpensively isolated and recovered by our new process. In addition, the completely glycosidated material remaining after removal of the methyl α-D-mannopyranoside provides a residue that may be used, among other uses, in polyester resin manufacture and as a solvent and humectant.

SUMMARY OF THE INVENTION

As is well-known to sugar chemists, the multiplicity of isomeric forms present in complex mixtures of sugars and their derivatives normally prevents the use of crystallization as means of recovering individual sugars from complex mixtures of the same. This is particularly true where the diversity and complexity of the carbohydrate mix is as great as that present in plant tissue and extracts thereof. In contrast to the general experience of workers skilled in this art, we have discovered that conversion of the carbohydrate in complex mixtures of related chemicals, such as those from plant tissue and its extracts to methyl glycosides will result in a solution from which methyl α-D-mannopyranoside can be preferentially crystallized to the exclusion of the other glycosides. This crystalline product can then be isolated and purified by suitable methods.

Specifically, we have found that when the dry mannose-containing plant material, or its extract, is reacted under essentially anhydrous conditions with methanol containing a mineral acid catalyst at a temperature between about 66° and 116° C. for from about 15 to 300 minutes, the polysaccharides and simple sugars are hydrolyzed and glycosidated to yield the corresponding methyl glycosides. The hot solution is then cooled, whereupon the single glycoside, methyl α-D-mannopyranoside, preferentially crystallizes out and can be filtered off. The crystalline methyl α-D-mannopyranoside can then be purified, if desired, by redissolving it in hot water or polar alcohols or mixtures of the same, decolorizing the solution with an adsorptant such as activated carbon, filtering and cooling, whereupon pure white crystalline methyl α-D-mannopyranoside crystallizes out in good yield.

DETAILED DESCRIPTION

As previously noted, our process can be employed to recover essentially pure methyl α-D-mannopyranoside from a wide variety of mannose-containing plant materials. Some of the plant materials such, for example, as guar gum, can be glycosidated without special pre-treatment. Others, such as coniferous woods, are first advantageously extracted to provide a non-cellulosic carbohydrate material that is high in mannose and polymers thereof. In still others, such as the spent liquors produced during sulfite pulping of coniferous woods, the liquor is first subjected to a purification treatment to remove lignin and other non-carbohydrate constituents which can interfere with glycoside recovery. In addition, where the polysaccharide content of the starting material is high it is often advantageous to subject it to a preliminary hydrolysis step to break down the polysaccharides and thereby provide a greater proportion of free sugars, including mannose.

In the process of our invention the starting material must be dry. How it is best dried depends upon the nature of the material. Some materials can be dried in an ordinary drying oven. For others spray drying is preferable. If neither of these methods is suitable the water can be removed by such known methods as azeotropic distillation or lyophilization (freeze drying).

The dry mannose-containing carbohydrate solids are reacted with anhydrous methanol containing a mineral acid catalyst such as HCl or $H_2SO_4$ at a temperature of from about 66° to 116° C. for from about 15 to 300 minutes to convert the carbohydrates to the corresponding simple wood sugar methyl glycosides. In general, the time required to effect substantially complete glycosidation of the sugars decreases with either an increase in the reaction temperature or an increase in the concentration of acid catalyst in the reaction mixture. Moreover, we have found that the weight ratio of anhydrous methanol to the mannose-containing starting material is advantageously at least about 0.8:1. We have also found that when the catalyst is hydrochloric acid the reaction mixture should contain between about 2 and 10 percent, and preferably between about 6 and 9 percent HCl, and that when the catalyst is sulfuric acid it should contain between about 5.4 and 26.0 percent, and preferably between about 16 and 25 percent by weight $H_2SO_4$. Our investigations also indicate that near optimum yields can be obtained when the methanolic solvent contains about 6 percent HCl and the reaction is carried out at about 90° C. for about 15 to 20 minutes.

Upon completion of the glycosidation reaction, the complex methanolic reaction solution is cooled to ambient temperature, and preferably is subjected to mild refrigeration, whereupon crude methyl α-D-mannopyranoside crystallizes out. The success of our invention is based upon the discovery that this specific isomer crystallizes preferentially to the substantial exclusion of the other methyl glycosides present in the methanolic solution. The unexpected preferential crystallization of methyl α-D-mannopyranoside makes possible the isolation and recovery of the substantially pure mannoside product. Crystallization of the crude methyl α-D-mannopyranoside proceeds readily, and when substantially complete the crop of relatively fine crystals are easily removed from the solution by any suitable procedure such as by filtration. The filtrate with its content of various methyl glycosides and other carbohydrates can then advantageously be treated by suitable methods for isolation and recovery of said mixed glycosides and the methanol.

As previously pointed out, the crude crystalline methyl α-D-mannopyranoside is readily purified by recrystallization techniques. To do this the crystals are dissolved in a suitable hot solvent (i.e., water or a polar alcohol such as ethanol or methanol or mixtures thereof) at a temperature as near reflux as practical. The hot solution is then clarified and decolorized by the addition of an adsorptive material such as activated carbon followed by removal of the adsorptive material by filtration. The clear solution is then cooled to ambient temperatures or below and preferably below 20° C., and allowed to stand whereupon crystalline methyl α-D-mannopyranoside is formed, filtered out, washed with cold solvent and dried. Depending upon the raw material and the reaction conditions used, yields as high as 50 to 55 percent of theoretical are readily obtained.

The following examples are illustrative but not limitative of the practice of our invention.

Example I

This example illustrates the spray drying of a water-soluble, non-cellulosic carbohydrate extract obtained from southern pine wood chips during the hot aqueous pressure treatment used to prepare them for pulping. It also illustrates the glycosidation of said spray dried material to produce methyl α-D-mannopyranoside by the process of our invention.

The raw extract material as obtained from the southern pine chips was concentrated to approximately 40 percent solids and spray dried under the following conditions: inlet air temperature 310–330° F., outlet air temperature 168–186° F., and chamber temperature 196–208° F. A brown powdered material was produced that had a caramel-like odor and the sugar analysis indicated in Table 1.

TABLE 1.—SUGAR ANALYSIS [1] OF SPRAY DRIED SOLIDS FROM AN AQUEOUS EXTRACT OF SOUTHERN PINE WOOD CHIPS

| Sugar | Percent based on oven-dry weight ||
|---|---|---|
|  | Monomeric sugars | Total sugars after hydrolysis |
| Galactose | 3.0 | 9.2 |
| Glucose | 1.6 | 12.0 |
| Mannose | 3.5 | 38.4 |
| Arabinose | 3.2 | 2.5 |
| Xylose | 5.6 | 9.8 |
| Total sugars | 16.9 | 71.9 |

[1] Determined by the method of Jefferey et al., Anal. Chem. 32, 1774 (1960). This analysis includes the monomeric and polymeric carbohydrates, the latter being determined in terms of their monomeric hydrolysis products.

200 grams of the spray-dried extract solids were refluxed with 400 ml. of anhydrous 3.0 percent methanolic HCl for 4.5 hours. The reacted solution was then filtered on a Buchner funnel with a filter aid, and the filtrate was placed in a freezer at −15° C. Crystals of methyl α-D-mannopyranoside began to form and after two days the crystalline phase was filtered off and washed with a small amount of cold methanol. Upon drying 11 grams of off-white crystals melting at 187–189° C. were recovered. The filtrate was replaced in the freezer for two more days whereupon one additional gram of crystals melting at 186–188° C. were obtained. Further crystallization for seven more days gave only one additional gram of crystals also having the same melting point for a total yield of 13 grams. A duplicate experiment gave a yield of 13.5 grams.

All of the crystals from the two experiments were combined and recrystallized overnight from four parts of 80 percent ethanol. The slight acidity in the recrystallization solution was neutralized with ammonium hydroxide. Treatment with activated carbon removed most of the color from the solution. The recrystallized material had a corrected melting point of 190–193° C. as compared to 192–193° C. for an authentic sample of methyl α-D-mannopyranoside. Mixed melting points obtained with the authentic sample of compositions 80:20, 50:50 and 20:80 were all 190–193° C.

Example II

The following example illustrates the mild acid hydrolysis of a hot aqueous extract of southern pine chips (similar to that used in Example I) for the purpose of breaking down the polysaccharides to simple sugars prior to glycosidation as an alternative route for preparing the methyl glycosides.

Ten gallons of the same type extract of southern pine chips as used in Example I, having a total solids content of 5 percent, was hydrolyzed with 0.5 percent by weight of $H_2SO_4$ at 110° C. in a stainless steel pressure vessel provided with a mechanical stirrer. After hydrolysis the solution was removed from the pressure vessel and filtered to remove a water-insoluble fraction. (The water-insoluble material was brown in color and had a methoxyl content of 9.8 percent and was assumed to be a lignin-type contaminant.) The filtered, hydrolyzed liquor was then neutralized and deionized by passing it through a series of ion exchange columns after which it was evaporated in a vacuum-flash evaporator to as thick a syrup as the evaporator could handle. The physical characteristics and sugar analysis of this syrup are listed in Table 2.

TABLE 2.—ANALYSIS OF HYDROLYZED PRODUCT FROM HOT AQUEOUS PINE WOOD EXTRACT

Total solids—79.5%.
pH—2.6.
Color—Cloudy dark brown.
Specific gravity (20° C.)—1.485.
Viscosity (20° C.)—24 poises.
Sulfated ash—0.076% on solids.

Sugar analysis: (monomeric sugars, percent on solids)

Galactose _____ 15.9
Glucose _____ 15.9
Mannose _____ 40.3
Arabinose _____ 8.0
Xylose _____ 15.2

Total sugars accounted for _____ 95.3

Dehydration of the above syrup was accomplished by azeotropic distillation with a water-immiscible solvent. The procedure was to add 125 ml. of toluene to 126 g. of syrup (equivalent to 100 g. of solids). The toluene-water azeotrope (B.P. 84° C., 19.6% water) was then distilled and the organic solvent phase returned continuously to the boiling flask while the water was retained in a trap. This procedure was also employed in determining the water content of the syrup. When all water had been removed, the flask was cooled slightly and the toluene decanted. Methanol (200 ml.) was then added and the toluene removed by distillation of the toluene-methanol azeotrope (B.P. 64° C., 31% toluene).

The reaction flask was cooled and enough methanolic HCl added to give 200 g. of 3.0% methanolic HCl. The reaction mixture was then refluxed for the indicated length of time. After purification of the reaction solution, the methyl α-D-mannopyranoside product was crystallized and filtered by suction, washed with small amount of cold methanol and air-dried. The product was fine, very white crystalline powder. Yields obtained using various reaction times are listed in Table 2a.

TABLE 2a.—YIELDS METHYL α-D-MANNOPYRANOSIDE

| Reaction time in hours | Yield,[1] weight percent | Yield [2] percent of theory |
| --- | --- | --- |
| 2.0 | 12.0 | 27.6 |
| 4.5 | 19.0 | 43.6 |
| 6.0 | 16.5 | 37.9 |
| 8.0 | 20.0 | 45.9 |
| 20.0 | 14.5 | 33.3 |
| 24.0 | 19.5 | 44.8 |

[1] Based on total solids of starting material.
[2] Based on mannose.

In the well-known "Masonite" process, wet wood chips are steam heated under high pressure, and the pressure is then suddenly released to break up the chips. When applied to coniferous wood chips this steam treatment dissolves a substantial amount of non-cellulosic carbohydrate material that is useful as a starting material in the present invention. The following example illustrates the production and recovery of methyl α-D-mannopyranoside from such an extract.

Example III

The extract liquor as received from the "Masonite" process was dried by lyophilization (i.e., freeze drying) and the dry material had the sugar analysis set out in Table 3. The sugar analysis was by the methods of Jeffery et al. as in Example I.

TABLE 3.—SUGAR ANALYSIS OF DRY MASONITE EXTRACT

| | Percent based on dry weight | |
| --- | --- | --- |
| Sugar | Monomeric sugars | Total sugars after hydrolysis |
| Galactose | 0.4 | 7.8 |
| Glucose | 1.4 | 11.4 |
| Mannose | 0.6 | 23.1 |
| Arabinose | 1.2 | 2.4 |
| Xylose | 1.4 | 14.6 |
| Total sugars | 5.0 | 59.3 |

One part of the above dry "Masonite" solids and 4 parts of 6.0 percent methanolic-HCl were reacted at 91° C. for 30 minutes. The reaction mixture was cooled, filtered to remove a small amount of insoluble material and neutralized with an anion exchange resin. The clarified solution was evaporated to a thick syrup, diluted with warm water and filtered to remove a dark colored water insoluble material (10% of the original solids). The filtrate was decolorized with activated carbon, evaporated to syrup and cooled. Inorganic salts (present in the raw material) precipitated at this point and were removed by filtration. Additional inorganic material was precipitated and removed from the evaporated filtrate by diluting with absolute ethanol and filtering. The clarified ethanol solution was evaporated to a syrup, taken up in methanol, cooled to 0° C., and seeded with a few crystals of methyl α-D-mannopyranoside. Methyl α-D-mannopyranoside was recovered in 3.4 percent yield based on the original solids. An additional 1.5 percent was recovered by evaporating the mother liquor to a syrup which was taken up in ethanol and crystallized out as above. The total yield was 4.9 percent.

Example IV

Several types of naturally occurring organic plant materials contain sufficient mannose components to be of use in our invention. Table 4 illustrates yields obtained using our process on three of them. The glycosidation reagent used in each case was 6 percent methanolic-HCl and the reaction was continued for 240 minutes at 91° C.

TABLE 4

Methyl α-D-mannopyranoside
Starting material: yield,[1] percent
  Mannan extracted from coffee grounds (40% potential mannan) _____ 16.7
  Guar gum (48% potential mannan) _____ 14.9
  Glucomannan extracted from wood pulp during refining with cold caustic solution (53% potential mannan) _____ 16.8

[1] Based on total solids of starting material.

Example V

A large sample of spray-dried solids from a hot aqueous extract of southern pine wood chips was obtained. It had a total solids content of 98.9 percent and a major carbohydrate portion containing monomeric sugars (14.5 percent) and low molecular weight oligo- and polysaccharides. Sugar analysis of the spray-dried material by the method of Jeffery et al. as used in Example I gave the following results.

TABLE 5

| Sugar: | Total sugars after hydrolysis percent based on oven dry weight |
|---|---|
| Galactose | 9.3 |
| Glucose | 12.0 |
| Mannose | 35.4 |
| Arabinose | 3.4 |
| Xylose | 10.9 |
| Total sugars | 71.0 |

Five liters of 6.0 percent methanolic-HCl and 2.5 kg. of the above spray-dried conifer wood extract were reacted together at 91° C. for 15 minutes in a tumbling tantalum lined autoclave. The reaction mixture was then cooled and refrigerated at 0° C. for three days. Crude methyl α-D-mannopyranoside was recovered by vacuum filtration and washed with cold methanol. The recovered tan-gray crystals (503 grams or 20.3 percent of the starting solids) contained 94.3 percent methyl α-D-mannopyranoside by analysis thereby corresponding to 50.3 percent of theory based on mannose.

Example VI

The following example illustrates the effect of variations in acid catalyst on the time and yield of the glycosidation reaction.

Portions of spray-dried hot water extract of southern pine chips similar to that used in Example V were glycosidated with the catalyst-solvent mixtures and for the temperatures and times indicated in Table 6 and then cooled. Product weight yields of the pure methyl α-D-mannopyranoside recovered are shown in the last column.

TABLE 6

| Acid catalyst used | Percent acid in the methanol-acid solvent, w./w. | Temperature, ° C. | Time at temperature, minutes | Methyl α-D-mannopyranoside yield, percent [2] |
|---|---|---|---|---|
| H₂SO₄ | 6.7 | Reflux [1] | 240 | 3.4 |
| H₂SO₄ | 13.0 | Reflux [1] | 240 | 14.6 |
| H₂SO₄ | 16.1 | Reflux [1] | 240 | 17.1 |
| H₂SO₄ | 16.1 | 91 | 15 | 18.3 |
| H₂SO₄ | 16.1 | 110 | 15 | 13.0 |
| HCl | 5.0 | Reflux [1] | 240 | 16.4 |
| HCl | 6.0 | Reflux [1] | 240 | 14.7 |
| HCl | 6.0 | 91 | 15 | 15.1 |

[1] Reflux temperature was approximately 66° C.
[2] Based on the total solids in the starting material.

Example VII

This example is illustrative of the effect of the weight ratio of raw material solids to the solvent used in the glycosidation reaction on the yield of the methyl α-D-mannopyranoside product.

Spray-dried extract of pine wood chips as used in Example V was treated at reflux with various amounts of methanol containing 5% HCl. Samples of the reaction mixture were removed at hourly intervals for workup and analysis. Each sample was centrifuged to recover a methanol insoluble residue which was weighed. The clarified liquid was then neutralized to pH 7 with a solution of sodium hydroxide in methanol and insoluble sodium chloride and other precipitated material were filtered off. The sample solution was then vacuum concentrated to remove methanol, thus leaving a viscous brown crude mixed methyl glycoside product. This crude mixture was treated with several volumes of water and filtered to recover a brown water insoluble fraction which was dried and weighed. The remaining solution was treated with a standard amount of decolorizing carbon to remove additional color bodies. The final sample solution was amber in color and contained a mixture of the methyl glycosides of wood sugars. A standard sample of this solution was analyzed by gas chromatography using a method adapted from the procedure of H. E. Brower et al., Annl. Chem. 38, 362 (1966). The results of this study are recorded in Table 7.

TABLE 7

| Parts solvent per part raw material | Reaction time, hrs. | Weight percent of original raw material solids | | |
|---|---|---|---|---|
| | | Methanol insoluble residue | Water insoluble fraction | Methyl α-D-mannopyranoside, yield |
| 2.50 | 1 | 7.2 | 8.3 | 27.4 |
| 2.50 | 4 | 5.0 | 8.0 | 31.3 |
| 1.25 | 1 | 7.9 | 7.1 | 18.6 |
| 1.25 | 4 | 4.8 | 9.7 | 27.1 |
| 0.83 | 1 | 4.4 | 7.8 | 16.6 |
| 0.83 | 4 | 1.4 | 8.7 | 25.7 |
| 0.62 | 1 | 8.0 | 5.0 | 6.3 |
| 0.62 | 4 | 3.4 | 6.8 | 14.6 |

Example VIII

The following example illustrates the preparation of a mannose-rich fraction from spent sulfite liquor from coniferous woods suitable for use in the practice of our invention.

Sodium-base spent sulfite liquor containing 53 percent solids was continuously concurrently extracted at room temperature with an equal volume of a solvent containing 75 percent isopropanol and 25 percent water. The solvent phase was processed for solvent recycle and recovery of a sugar-rich fraction amounting to about 10 percent of the original spent sulfite liquor solids. On a solids basis, the initial spent sulfite liquor and the sugar-rich fraction contained the following sugar and lignosulfonate components as determined by paper chromatography and ultraviolet spectroscopy, respectively.

TABLE 8

| | Spent sulfite liquor, percent | Sugar-rich fraction, percent |
|---|---|---|
| Sodium lignosulfonate | 61.5 | 32.3 |
| Monomeric sugars: | | |
| Galactose | 3.1 | 4.3 |
| Glucose | 3.3 | 4.3 |
| Mannose | 12.1 | 19.4 |
| Arabinose | 1.5 | 1.9 |
| Xylose | 3.3 | 5.8 |

100 parts by weight of the vacuum-dried sugar-rich fraction of the foregoing sodium-base spent sulfite liquor was treated with 200 parts of methanol containing 3 percent HCl. The reaction solution was refluxed for five hours. 10.36 parts of crystalline methyl α-D-mannopyranoside were recovered. This yield corresponds to 49.6 percent of theory based on the mannose analysis of the starting material.

Example IX

The following example illustrates the practice of our invention utilizing an enriched sugar fraction obtained from spray-dried spent sulfite liquor.

1,080 parts by weight of spray-dried sodium-base spent sulfite liquor, having 5 percent moisture content, was heated with 2,380 parts of methanol containing 0.25 percent HCl to boiling for 30 minutes with stirring. The liquid phase was decanted through a filter and the residue re-extracted twice with 396 parts by weight of the same solvent and under the same conditions. The filtered methanol-HCl extract was then processed to recover and recycle the major portion of the solvent while yielding 1,342 parts of a concentrated solution containing 770 parts of dissolved solids. This corresponds to about 75 percent of the original dry weight of the spent sulfite liquor and contains essentially all the carbohydrate components. From the analysis of sodium-base spent sulfite liquor as given in Example IV, it was calculated that this enriched fraction contained the following sugars:

TABLE 9

| Sugars: | Sugar-rich fraction, percent |
|---|---|
| Galactose | 4.1 |
| Glucose | 4.4 |
| Mannose | 16.1 |
| Arabinose | 2.0 |
| Xylose | 4.4 |
| Total sugars | 31.0 |

174 parts of the above methanol solution containing 100 parts of sugar-rich spent sulfite liquor solids fraction were treated with 100 parts of methanol containing 6 percent HCl. The reaction mixture was refluxed for five hours, cooled, and then seeded with a trace of methyl α-D-mannopyranoside and refrigerated. After five days, 10.4 parts of crude methyl α-D-mannopyranoside were recovered by filtration and washing with ice cold methanol. Recrystallization of this product yielded pure methyl α-D-mannopyranoside in approximately 50 percent yield of theory based on the mannose analysis of the starting material.

We claim:
1. Process for producing essentially pure methyl α-D-mannopyranoside from plant material containing a mixture of carbohydrates including mannose or polymers or copolymers thereof which comprises:
   reacting said plant material with methanol in the presence of a mineral acid under substantially anhydrous conditions at a temperature of between about 66° and 116° C. for about 15 to 300 minutes to convert the carbohydrates present in the plant material to a mixture of the corresponding methyl glycosides,
   cooling the resulting acidic methanolic solution of methyl glycosides to ambient temperature or below to effect preferential crystallization of methyl α-D-mannopyranoside from said methanolic solution, and
   recovering said crystals of methyl α-D-mannopyranoside.
2. The process according to claim 1 in which the recovery of the crystals of methyl α-D-mannopyranoside comprises filtering the solution containing the precipitate of methyl α-D-mannopyranoside, redissolving the precipitate in a hot solvent selected from the group consisting of water and polar alcohols and mixtures thereof, treating the resulting solution with an adsorptive material, filtering the resulting clarified and decolorized solution, cooling the solution to ambient temperature or below to crystallize essentially pure methyl α-D-mannopyranoside, and recovering said crystalline product.
3. The process according to claim 1 in which the mannose-containing plant material comprises a hot aqueous extract of coniferous wood.
4. The process according to claim 1 in which the mannose-containing plant material is spent sulfite liquor.
5. The process according to claim 1 in which the mannose-containing plant material is a sugar-rich fraction of spent sulfite liquor.
6. The process according to claim 1 in which the mannose-containing plant material is selected from the group consisting of locust beans, guar seeds, coffee beans and conifer woods.
7. The process according to claim 1 in which the anhydrous methanol contains between about 2 to 10 percent by weight HCl.
8. The process according to claim 1 in which the anhydrous methanol contains between about 6 to 9 percent by weight HCl.
9. The process according to claim 1 in which the anhydrous methanol contains about 6 percent by weight HCl, and in which the glycosidation reaction is carried out at a temperature of about 90° C. for about 15 to 20 minutes.
10. The process according to claim 1 in which the anhydrous methanol contains between about 5.4 to 26.0 percent by weight $H_2SO_4$.
11. The process according to claim 1 in which the resulting acidic methanolic solution of methyl glycosides is cooled to below about 20° C.

References Cited

UNITED STATES PATENTS

| 2,276,621 | 3/1942 | Langlois | 260—210 |
| 2,350,299 | 5/1944 | Stoll et al. | 260—210 |
| 2,390,507 | 12/1945 | Cantor | 260—210 |
| 3,240,775 | 3/1966 | Schweiger | 260—209 |

LEWIS GOTTS, Primary Examiner

J. R. BROWN, Assistant Examiner